(12) United States Patent
Ueda et al.

(10) Patent No.: US 7,516,540 B2
(45) Date of Patent: Apr. 14, 2009

(54) ELECTRICAL DEVICE HAVING COMPONENT FIXING DEVICE

(75) Inventors: Hidenori Ueda, Tokyo (JP); Masato Yamazaki, Tokyo (JP); Emiko Baba, Tokyo (JP)

(73) Assignee: Oki Data Corporation, Tokyo (JP)

(*) Notice: Subject to any disclaimer, the term of this patent is extended or adjusted under 35 U.S.C. 154(b) by 226 days.

(21) Appl. No.: 11/210,703

(22) Filed: Aug. 25, 2005

(65) Prior Publication Data
US 2006/0053622 A1    Mar. 16, 2006

(30) Foreign Application Priority Data
Sep. 14, 2004    (JP) .............. 2004-267362

(51) Int. Cl.
*B23P 19/00*    (2006.01)
*H01R 43/00*    (2006.01)
(52) U.S. Cl. .............. 29/745; 29/754; 29/834; 248/74.3; 336/175
(58) Field of Classification Search ........... 29/745–748, 29/751–754, 832, 834, 868; 174/36, 360, 174/117 F; 248/68.1, 69, 71, 74.3; 336/92, 336/174, 175
See application file for complete search history.

(56) References Cited

U.S. PATENT DOCUMENTS

| | | | | |
|---|---|---|---|---|
| 3,143,325 A | * | 8/1964 | Carpenter et al. | 248/68.1 |
| 4,125,240 A | * | 11/1978 | Heard | 248/73 |
| 4,783,029 A | * | 11/1988 | Geppert et al. | 248/74.1 |
| 5,264,814 A | * | 11/1993 | Yamazaki et al. | 29/606 |
| 5,533,696 A | * | 7/1996 | Laughlin et al. | 248/74.2 |
| 5,725,185 A | * | 3/1998 | Auclair | 248/73 |
| 6,268,787 B1 | * | 7/2001 | Onizuka | 336/92 |
| 6,603,077 B2 | * | 8/2003 | Hirai | 174/78 |

* cited by examiner

*Primary Examiner*—Donghai D. Nguyen
(74) *Attorney, Agent, or Firm*—Kubotera & Associates, LLC

(57) ABSTRACT

A component fixing device includes a holding portion for holding a component with a hollow portion while restricting a movement of the component; and a fixed portion elastically connected to the holding portion and to be fixed to an object. The holding portion is inserted into the hollow portion of the component for holding the component. The holding portion may have a center holding portion abutting against an outer surface of the component and a pair of arm portions disposed at both sides of the center holding portion and capable of bending relative to the center holding portion, so that the center holding portion and the arm portions sandwich the component.

10 Claims, 11 Drawing Sheets

ELECTRICAL DEVICE HAVING COMPONENT FIXING DEVICE

BACKGROUND OF THE INVENTION

The present invention relates to a component fixing device for fixing a component such as a ferrite core of an electrical device such as a copier and an electronic photo printer, and an electrical device having the same.

Conventionally, a ferrite core is provided on a cable for reducing an electrical noise generated in an electrical device such as a copier and an electronic photo printer. Japanese Patent Publication No. 2000-173827 has disclosed a method of fixing a ferrite core to an object. That is, a cable passes through a hollow portion of a ferrite core, and the ferrite core is retained in a storage case. The storage case is provided with a connecting portion with a claw, so that the storage case is attached to a housing or a board of an electrical device as the object. In this case, it is necessary to provide a space at the object for fixing the storage case, thereby causing limitation in a location for fixing the ferrite core.

In view of the problems described above, an object of the present invention is to provide a component fixing device for fixing a ferrite core to an object even when it is difficult to provide a sufficient space for fixing the ferrite core.

Further objects and advantages of the invention will be apparent from the following description of the invention.

SUMMARY OF THE INVENTION

In order to attain the objects described above, according to the present invention, a component fixing device includes a holding portion for holding a component with a hollow portion while restricting a movement of the component; and a fixed portion elastically connected to the holding portion and to be fixed to an object. The holding portion is inserted into the hollow portion of the component for holding the component. The holding portion may have a center holding Portion abutting against an outer surface of the component and a pair of arm portions disposed at both sides of the center holding portion and capable of bending relative to the center holding portion, so that the center holding portion and the arm portions sandwich the component.

DETAILED DESCRIPTION OF THE PREFERRED EMBODIMENTS

Hereunder, embodiments of the present invention will be explained with reference to the accompanying drawings. In the embodiments, a ferrite core is used as an example of a component to be fixed with a component fixing device.

First Embodiment

Figure 1:
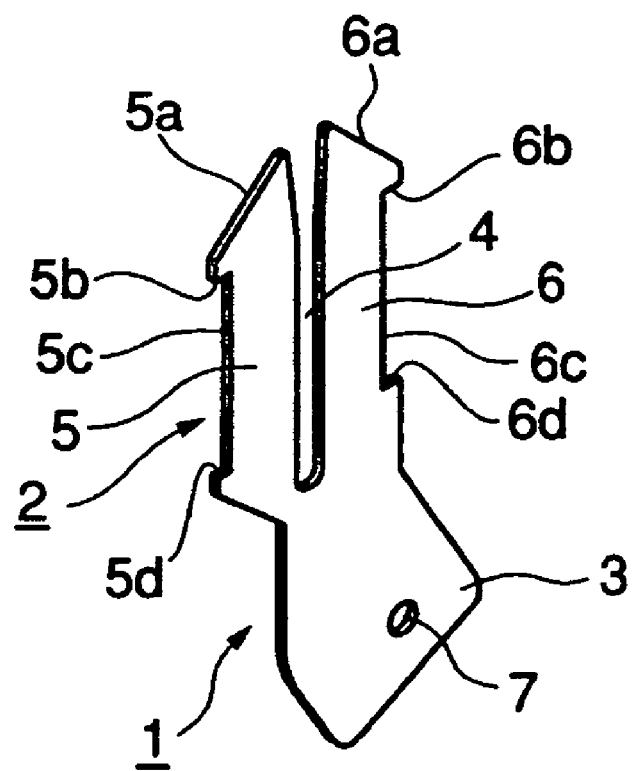
FIG. 1 is a perspective view showing a component fixing device according to a first embodiment of the present invention.
Figure 2:
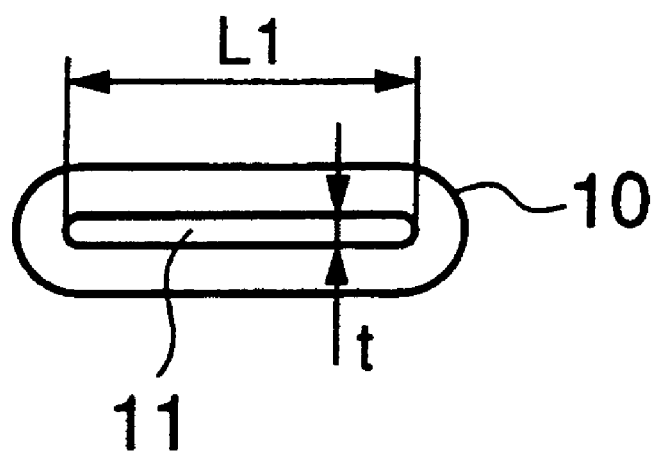
FIG. 2 is a front view showing a ferrite core as a component according to the first embodiment of the present invention.
Figure 3:
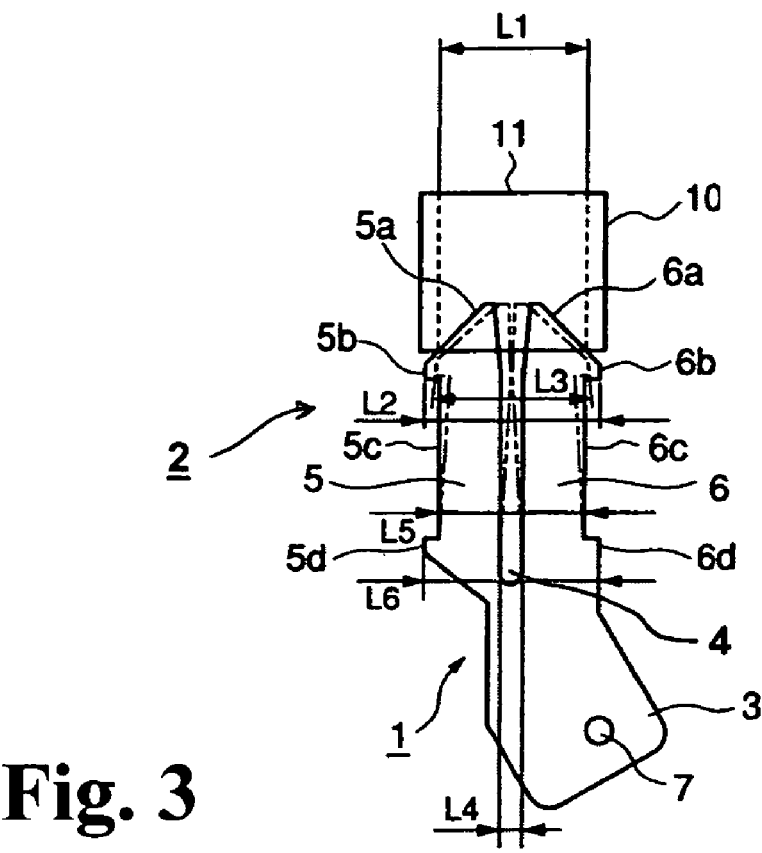
FIG. 3 is a front view showing the component fixing device according to the first embodiment of the present invention.

FIG. 1 is a perspective view showing a ferrite core fixing device as a component fixing device according to a first embodiment of the present invention. FIG. 2 is a front view showing a ferrite core as a component according to the first embodiment of the present invention. FIG. 3 is a front view showing the component fixing device according to the first embodiment of the present invention.

As shown in FIG. 1, a ferrite core fixing device 1 is formed of an elastic sheet, and includes a holding portion 2 and a fixed portion 3 to be fixed to an object. The holding portion 2 has a pair of arm portions 5 and 6 having a linear symmetrical shape and a groove portion 4 between the arm portions 5 and 6. The arm portions 5 and 6 have chamfered portions 5a and 6a and hook claws 5b and 6b at distal end portions thereof (upper side in FIG. 1). The arm portions 5 and 6 also have engaging portions 5c and 6c extending in parallel to the groove portion 4 at middle outside thereof. Step portions 5d and 6d are formed at lower ends of the engaging portions 5c and 6c. The fixed portion 3 includes a screw hole 7 at a position shifted to one side from an extension line of the groove portion 4 of the holding portion 2 for fixing the ferrite core fixing device 1 to an object.

In the present embodiment, a material of the ferrite core fixing device 1 includes polyethylene terephthalate (PET). The ferrite core fixing device 1 has a thickness of, for example, 0.5 mm. Instead of polyethylene terephthalate, the ferrite core fixing device 1 may be formed of other plastic materials such as an ABS resin and an engineering plastic, or a metal film with characteristics similar to those of the plastic materials described above.

As shown in FIG. 2, a ferrite core 10 has a hollow portion 11 with a flat oval shape. The hollow portion 11 has a width (long side) L1 of, for example, 10 mm, and a height (short side) t of, for example, 1 mm. As described above, the ferrite core fixing device 1 has a thickness of 0.5 mm. A flat cable 12 (described alter) has a thickness of, for example, 0.3 mm. Accordingly, the ferrite core fixing device 1 and the flat cable 12 can pass through the hollow portion 11 of the ferrite core 10 at the same time.

A dimensional relationship between the ferrite core fixing device 1 and the hollow portion 11 of the ferrite core 10 will be explained with reference to FIG. 3. A largest width of the holding portion 2 of the ferrite core fixing device 1, i.e., a distance L2 from the hook claw 5b to the hook claw 6b, is set to be greater than the width L1 of the hollow portion 11 of the ferrite core 10. The groove portion 4 is disposed between the arm portions 5 and 6 of the ferrite core fixing device 1. Accordingly, the arm portions 5 and 6 can bend toward each other and contact with each other when an external force is applied.

A width L4 of the groove portion 4 is set such that a distance L3 between the hook claws 5b and 6b becomes smaller than the width L1 of the hollow portion 11 when the arm portions 5 and 6 bend and contact with each other with an external force (state represented by phantom lines in FIG. 3). In other words, each width is set so that the following relationships are established; L1<L2, L1>L3, L3=L2−L4. Further, a distance L5 between the engaging portions 5c and 6c of the ferrite core fixing device 1 is set to be smaller than the distance L2 from the hook claw 5b to the hook claw 6b, and to be equal to or slightly larger than the width L1 of the hollow portion 11 of the ferrite core fixing device 1. Accordingly, it is possible to reduce rattle between the engaging portions 5c and 6c and the ferrite core fixing device 1 when the engaging portions 5c and 6c of the ferrite core fixing device 1 are inserted into the hollow portion 11 of the ferrite core 10. Further, a distance L6 between the step portions 5d and 6d of the ferrite core fixing device 1 is set to be greater than the width L1 of the hollow portion 11 of the ferrite core 10.

Figure 4:
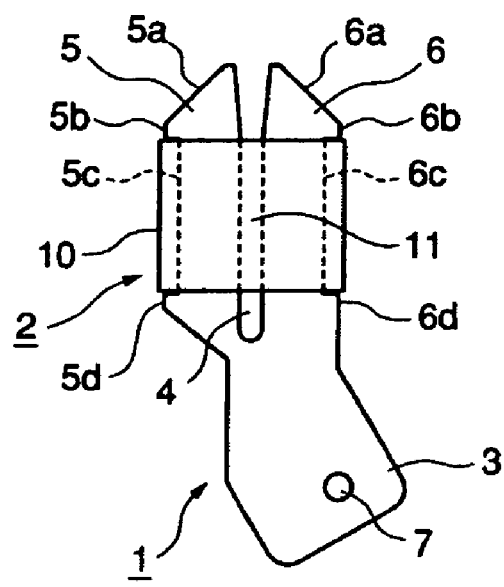
FIG. 4 is a front view showing the component fixing device according to the first embodiment of the present invention in a state that a holding portion of the component fixing device passes through a hollow portion of a ferrite core.

An operation of the ferrite core fixing device 1 for holding the ferrite core 10 will be explained next. FIG. 4 is a view a state that the holding portion 2 of the ferrite core fixing device 1 passes through the hollow portion 11 of the ferrite core 10. The holding portion 2 of the ferrite core fixing device 1 is inserted into the hollow portion 11 of the ferrite core 10 as follows. First, the flat cable (not shown) is inserted into the hollow portion 11 of the ferrite core 10. As shown in FIG. 3, the chamfered portions 5a and 6a abut against both end portions of the hollow portion 11 of the ferrite core 10, so that the holding portion 2 is pushed into the hollow portion 11 from this state. With the pushing operation, the arm portions 5 and 6 bend in a direction approaching with each other to become the state represented by the phantom lines in FIG. 3. In this state, it is possible to insert the arm portions 5 and 6 into the hollow portion 11.

When the hook claws 5b and 6b of the ferrite core fixing device 1 pass through the hollow portion 11, the arm portions 5 and 6 return to the original state separating from each other with a restoration force thereof as shown in FIG. 4. Therefore, the holding portion 2 does not come off from the hollow portion 11. At this time, since the distance L5 between the engaging portions 5c and 6c is set to be slightly greater than the width L1 of the hollow portion 11 of the ferrite core fixing device 1, the engaging portions 5c and 6c are pressed against an outer surface of the hollow portion 11, thereby eliminating rattle. The engaging portions 5c and 6c have a length (distance from lower ends of the hook claws 5b and 6b to upper ends of the step portions 5d and 6d) is set to be slightly greater than a length of the ferrite core 10 (vertical length in FIG. 4), so that the ferrite core 10 is held with the engaging portions 5c and 6c between the hook claws 5b and 6b and the step portions 5d and 6d.

Figure 5:
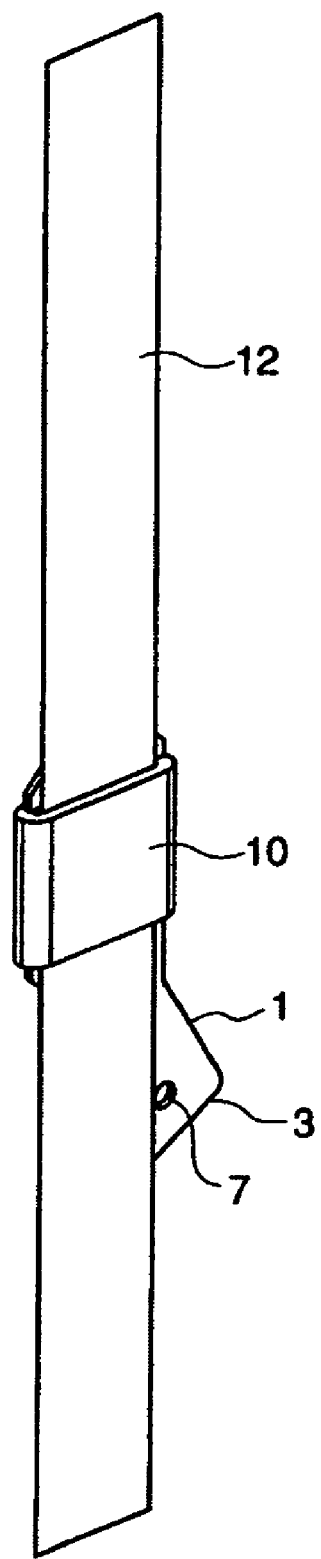
FIG. 5 is a perspective view showing the component fixing device according to the first embodiment of the present invention in a state that the component fixing device holds the ferrite core (No. 1)
Figure 6:
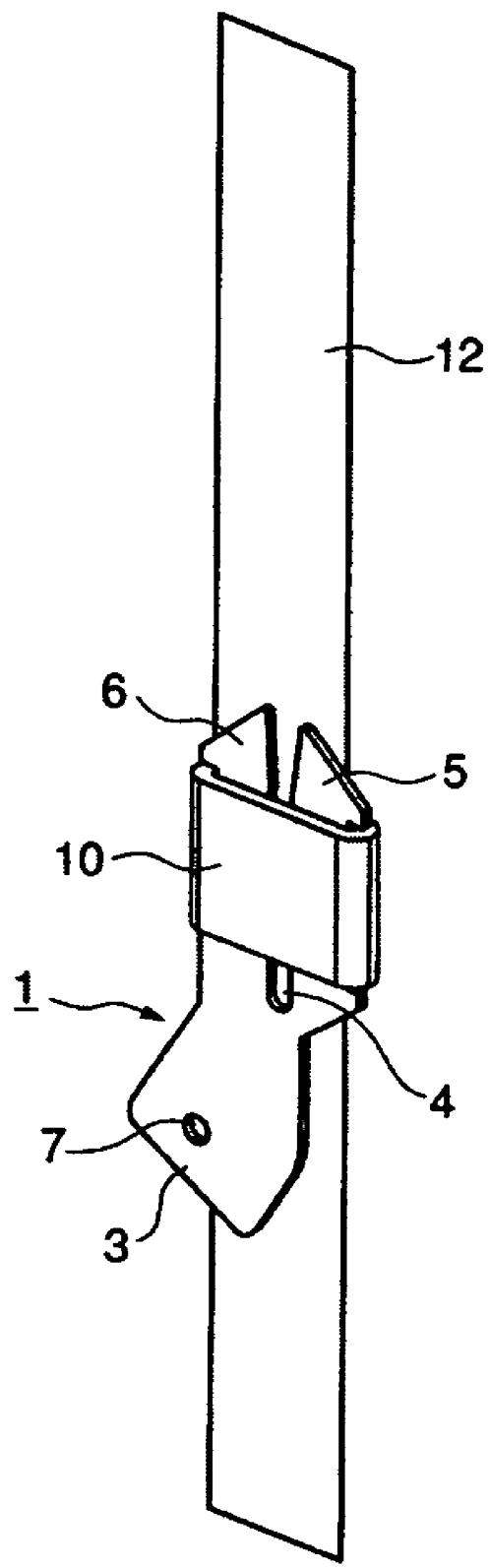
FIG. 6 is a perspective view showing the component fixing device according to the first embodiment of the present invention in a state that the component fixing device holds the ferrite core (No. 2)

FIGS. 5 and 6 are views showing a state that the ferrite core fixing device 1 holds the ferrite core 10. As shown in FIGS. 5 and 6, the ferrite core fixing device 1 holds the flat cable 12 and the ferrite core 10. In this state, since the screw hole 7 of the fixed portion 3 is apart from the flat cable 12, the flat cable 12 does not become an obstacle when the ferrite core fixing device 1 is attached to the object. It is arranged such that the ferrite core 10 and the ferrite core fixing device 1 are movable relative to the flat cable 12 in a longitudinal direction of the flat cable 12.

Figure 7:
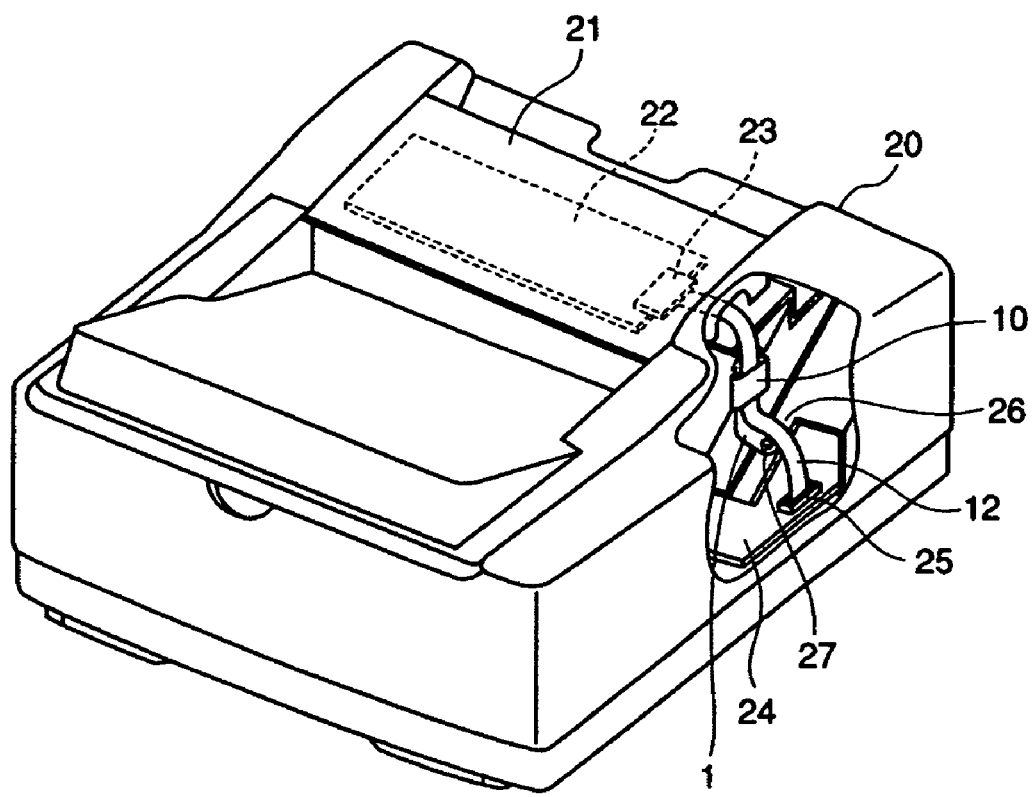
FIG. 7 is a perspective view showing the component fixing device according to the first embodiment of the present invention in a state that the component fixing device is attached to an electronic photo printer.

A process of attaching the ferrite core fixing device 1 holding the ferrite core 10 to an object will be explained next. In this embodiment, the object is an electronic photo printer as an example. FIG. 7 is a perspective view showing the ferrite core fixing device 1 in a state that the ferrite core fixing device 1 is attached to an electronic photo printer 20. In FIG. 7, the electronic photo printer 20 is shown in a state that a portion thereof where the ferrite core fixing device 1 is fixed is cut out for easy explanation.

As shown in FIG. 7, an operation portion board 22 is disposed inside an operation portion case 21 of the electronic photo printer 20, and a connector 23 is connected to the operation portion board 22. The connector 23 is connected to an end portion of the flat cable 12. A control board 24 is disposed at a bottom of the electronic photo printer 20, and a connector 25 is connected to the control board 24. The connector 24 is connected to the other end of the flat cable 12. Accordingly, the operation portion board 22 is electrically connected to the control board 24 through the flat cable 12.

The flat cable 12 passes through the ferrite core 10, and the ferrite core fixing device 1 holds the ferrite core 10. The ferrite core fixing device 1 is fixed to a frame 26 at a side of the electronic photo printer 20 with a screw 27. In the electronic photo printer 20 shown in FIG. 7, an attaching surface of the frame 26 extends substantially in a horizontal direction. Accordingly, the ferrite core fixing device 1 is fixed to the frame 26 in a state that the fixed portion 3 is bent at the right angle relative to the holding portion 2.

As described above, the ferrite core 10 and the ferrite core fixing device 1 are movable relative to the flat cable 12. Accordingly, it is possible to fix the ferrite core 10 at an appropriate position on the electronic photo printer 20 by moving the ferrite core 10 and the ferrite core fixing device 1 relative to the flat cable 12. Further, it is also possible to fix the ferrite core 10 at an appropriate position on the electronic photo printer 20 by bending the fixed portion 3 relative to the holding portion 2 of the ferrite core fixing device 1 to properly change a shape of the ferrite core fixing device 1.

When the ferrite core 10 is removed from the electronic photo printer 20, an operation reversed from the operation described above is performed. That is, the screw 27 fixing the ferrite core fixing device 1 to the frame 26 is removed, so that the ferrite core fixing device 1 is removed from the frame 26. Then, the arm portions 5 and 6 of the ferrite core fixing device 1 are bent to approach with each other, and the ferrite core fixing device 1 is pulled out from the hollow portion 11 of the ferrite core 10. Alternatively, the ferrite core 10 may be pulled out from the ferrite core fixing device 1 in a state that the ferrite core fixing device 1 is fixed to the frame 26. In this case, it is easy to perform a maintenance operation of the electronic photo printer 20.

As described above, in the first embodiment, the holding portion 2 of the ferrite core fixing device 1 is inserted into the hollow portion 11 of the ferrite core 10 to hold the ferrite core 10, and the ferrite core fixing device 1 is fixed to the object with the fixed portion 3 of the ferrite core fixing device 1. Accordingly, it is possible to easily attach the ferrite core 10 to the object in a simple way. Further, it is possible to reduce an area for attaching the ferrite core 10. Since the ferrite core fixing device 1 is formed of an elastic sheet, it is possible to properly change a shape of the ferrite core fixing device 1 according to a shape of the object. It is not necessary to use a special tool for molding the ferrite core fixing device 1, thereby making it possible to produce the ferrite core fixing device 1 with low cost.

Second Embodiment

Figure 8:
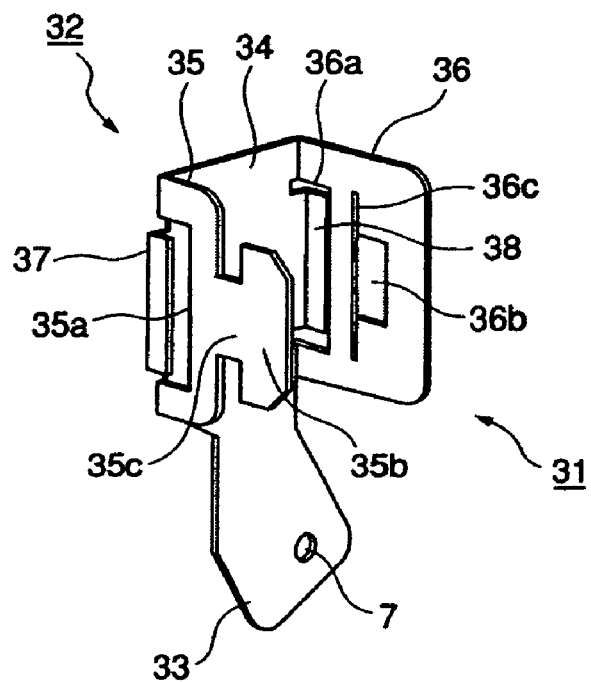
FIG. 8 is a perspective view showing a component fixing device according to a second embodiment of the present invention.

FIG. 8 is a perspective view showing a ferrite core fixing device according to a second embodiment of the present invention. As shown in FIG. 8, similar to the ferrite core fixing device 1 in the first embodiment, a ferrite core fixing device 31 is formed of an elastic sheet and includes a holding portion 32 and a fixed portion 33 to be fixed to an object.

The holding portion 32 has a center holding portion 34 and a pair of arm portions 35 and 36 capable of bending at both sides of the center holding portion 34. The arm portions 35 and 36 have rectangular holes 35a and 36a at base portions thereof close to bending portions thereof, respectively. The arm portion 35 has a hook claw 35b at a distal end thereof. The arm portion 36 has a rectangular hole 36b with a cut portion 36c. The hook claw 35b can be inserted into the cut portion 36c. A base portion 35c of the hook claw 35b enters the rectangular hole 36b of the arm portion 36, so that the arm portion 35 engages the arm portion 36.

The rectangular holes 35a and 36a have a height (lateral length in FIG. 8) slightly larger than the thickness of the ferrite core 10. The rectangular holes 35a and 36a have a width (vertical length in FIG. 8) slightly larger than the length of the ferrite core 10. Accordingly, the ferrite core 10 can enter the rectangular holes 35a and 36a. A width of the center holding portion 34, i.e., a distance between the arm portions 35 and 36, is set to be slightly larger than a width of the flat cable 12 (FIG. 9) and slightly smaller than the width of the ferrite core 10.

Bent portions 37 and 38 are formed at both sides of the center holding portion 34 to enter the rectangular holes 35a and 36a, respectively. The bent portions 37 and 38 have a width (vertical length in FIG. 8) substantially same as the length of the ferrite core 10. A distance between the bent portions 37 and 38 is set to be substantially same as the width of the ferrite core 10. Similar to the ferrite core fixing device 1, the fixed portion 33 has a screw hole 7 for fixing the ferrite core fixing device 31 to an object. The screw hole 7 is formed at a position shifted from a position where the flat cable 12 passes through.

Figure 9:
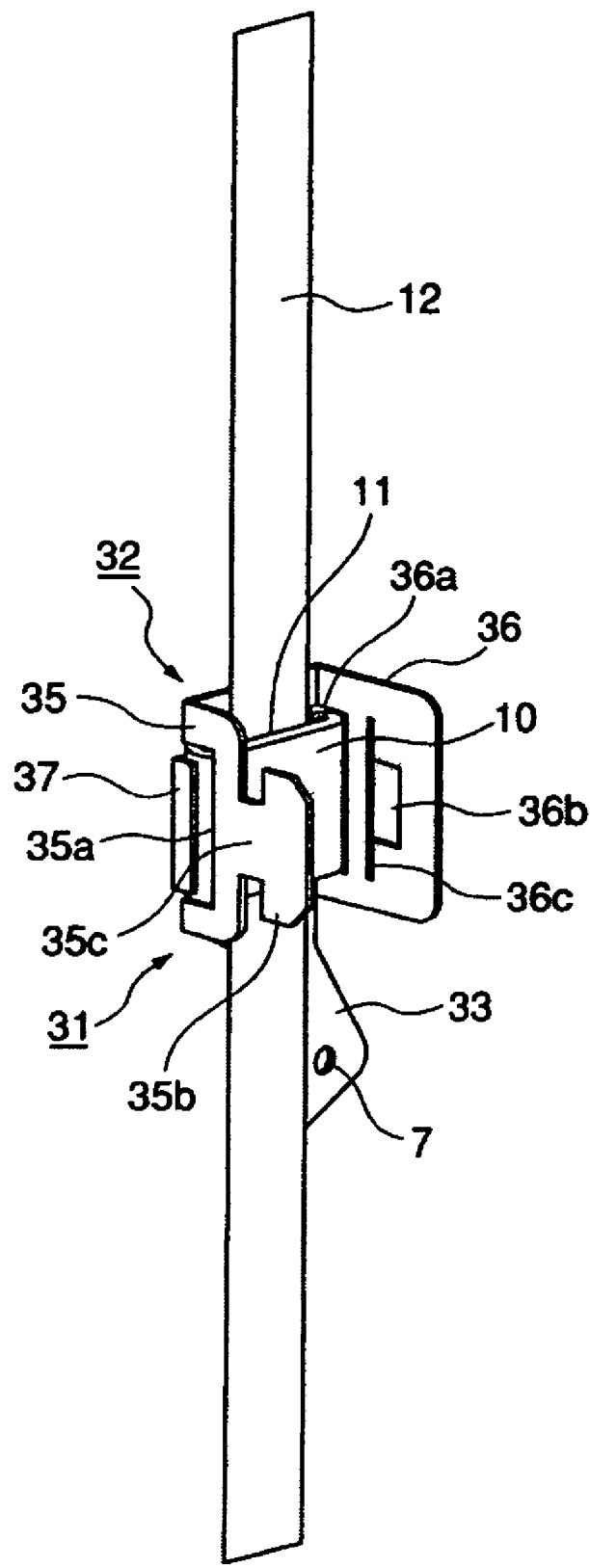
FIG. 9 is a perspective view showing the component fixing device according to the second embodiment of the present invention in a state that the component fixing device holds a ferrite core.
Figure 10:
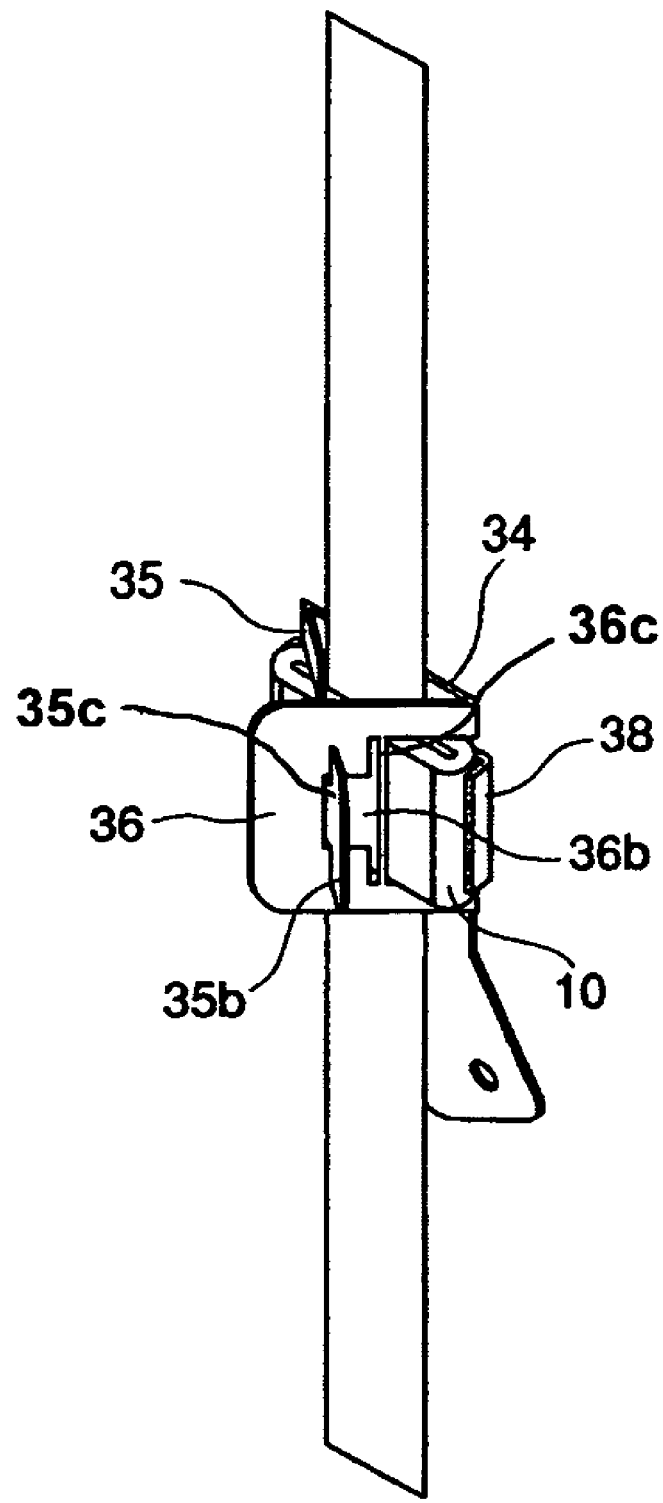
FIG. 10 is a perspective view showing the component fixing device according to the second embodiment of the present invention in a state that the component fixing device holds the ferrite core.

An operation of the ferrite core fixing device 31 for holding the ferrite core 10 will be explained next. FIG. 9 is a perspective view showing an operation of the ferrite core fixing device 31 for holding the ferrite core 10. FIG. 10 is a perspective view showing the ferrite core fixing device 31 in a state that the ferrite core fixing device 31 holds the ferrite core 10. As shown in FIG. 9, first, the flat cable 12 passes through the hollow portion 11 of the ferrite core 10. In a state that ferrite core 10 abuts against the center holding portion 34 of the ferrite core fixing device 31 (FIG. 8), the arm portions 35 and 36 are bent. At this time, both side portions of the ferrite core 10 enter the rectangular holes 35a and 36a, so that the arm portions 35 and 36 are easily bent. Then, the ferrite core 10 enters the rectangular holes 35a and 36a, so that a movement thereof in the vertical direction is restricted. Further, the bent portions 37 and 38 restrict a movement of the ferrite core 10 in the lateral direction.

Next, as shown in FIG. 10, the hook claw 35b of the arm portion 35 is inserted into the cut portion 36c of the arm portion 36. The base portion 35c of the hook claw 35b enters the rectangular hole 36b. Accordingly, the arm portion 35 engages the arm portion 36 in a state of holding the ferrite core 10. Similar to the first embodiment, the ferrite core fixing device 31 holding the ferrite core 10 is fixed to the object with a screw. That is, a screw is inserted into the screw hole 7 formed in the fixed portion 33 of the ferrite core fixing device 31 to fix the ferrite core fixing device 31 to the frame of the electronic photo printer 20.

When the ferrite core 10 is removed from the electronic photo printer 20, an operation reversed from the operation described above is performed. That is, the screw fixing the ferrite core fixing device 31 to the frame is removed, so that the ferrite core fixing device 31 is removed from the frame. The hook claw 35b of the arm portion 35 of the ferrite core fixing device 31 is pulled out from the rectangular hole 36b of the arm portion 36. The arm portions 35 and 36 are opened to release the ferrite core 10. Alternatively, the ferrite core 10 may be pulled out from the ferrite core fixing device 31 in a state that the ferrite core fixing device 31 is fixed to the frame. In this case, it is easy to perform a maintenance operation of the electronic photo printer 20.

As described above, in the second embodiment, the ferrite core fixing device 31 sandwiches and holds the ferrite core 10 from outside. Accordingly, in addition to the advantages of the first embodiment, it is possible to fix the ferrite core 10 regardless of a size of the hollow portion 11 of the ferrite core 10. The ferrite core 10 is sandwiched and held from outside not to move in the vertical and lateral directions. Accordingly, it is possible to prevent the ferrite core 10 from hitting and damaging a surrounding part due to a vibration or an impact of a device as the object. It is possible to hold the ferrite core 10 simply by engaging the arm portions 35 and 36, thereby making it easy to attach the ferrite core 10.

Third Embodiment

Figure 11:
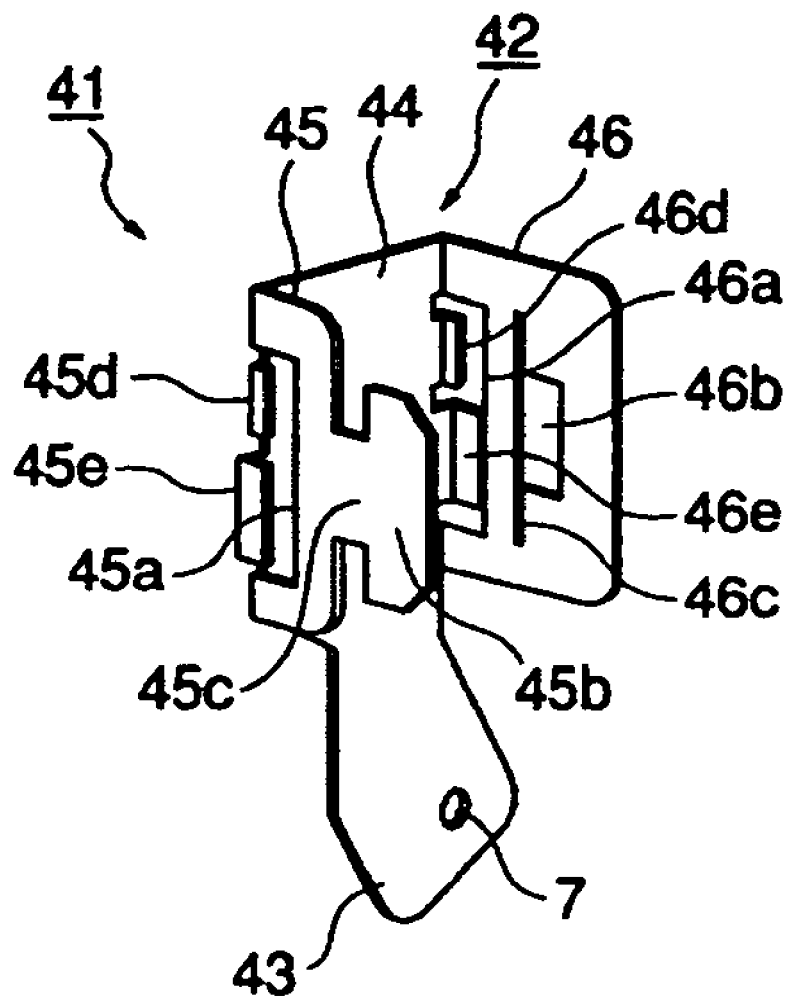
FIG. 11 is a perspective view showing a component fixing device according to a third embodiment of the present invention.

FIG. 11 is a perspective view showing a ferrite core fixing device according to a third embodiment of the present invention. As shown in FIG. 11, similar to the ferrite core fixing device 1 in the first embodiment, a ferrite core fixing device 41 is formed of an elastic sheet, and includes a holding portion 42 and a fixed portion 43 to be fixed to an object.

The holding portion 42 has a center holding portion 44 and a pair of arm portions 45 and 46 capable of bending at both sides of the center holding portion 44. The arm portions 45 and 46 have rectangular holes 45a and 46a at base portions thereof close to bending portions thereof, respectively. The arm portion 45 has a hook claw 45b at a distal end thereof. The arm portion 46 has a rectangular hole 46b with a cut portion 46c. The hook claw 45b can be inserted into the cut portion 46c. A base portion 45c of the hook claw 45b enters the rectangular hole 46b of the arm portion 46, so that the arm portion 45 engages the arm portion 46.

In the ferrite core fixing device 41, similar to the ferrite core fixing device 31 in the second embodiment, the rectangular holes 45a and 46a have a height (lateral length in FIG. 11)

slightly larger than the thickness of the ferrite core 10. The rectangular holes 45a and 46a have a width (vertical length in FIG. 11) slightly larger than the length of the ferrite core 10. Accordingly, the ferrite core 10 can enter the rectangular holes 45a and 46a. A width of the center holding portion 44, i.e., a distance between the arm portions 45 and 46, is set to be slightly larger than the width of the flat cable 12 (FIG. 12) and slightly smaller than the width of the ferrite core 10.

Two types of bent portions 45d, 46d and 45e, 46e are formed at both sides of the center holding portion 44, respectively. The bent portions 45d and 45e are arranged to enter the rectangular hole 45a, and the bent portions 46d and 46e are arranged to enter the rectangular hole 46a, respectively. A distance between the bent portions 45e and 46e is set to be slightly larger than the width of the ferrite core 10. The bent portions 45e and 46e sandwich the ferrite core 10 from outside to restrict a movement of the ferrite core 10 in the lateral direction.

A distance between the bent portions 45d and 46d is set to be substantially same as the distance between the arm portions 45 and 46. The bent portions 45d and 46d have a height smaller than that of the bent portions 45e and 46e. Accordingly, when the holding portion 42 holds the ferrite core 10, the bent portions 45d and 46d become a pressed state with side surface portions of the ferrite core 10. As described alter, the bent portions 45d and 46d are provided for restricting a movement of a ferrite core 14 having a size smaller than the ferrite core 10 (FIG. 14) in the vertical direction when the ferrite core fixing device 41 holds the ferrite core 14. Similar to the ferrite core fixing device 1 in the first embodiment, the fixed portion 43 has the screw hole 7 for fixing the ferrite core fixing device 41 to an object. The screw hole 7 is formed at a position shifted from a position where the flat cable 12 passes through.

Figure 12:
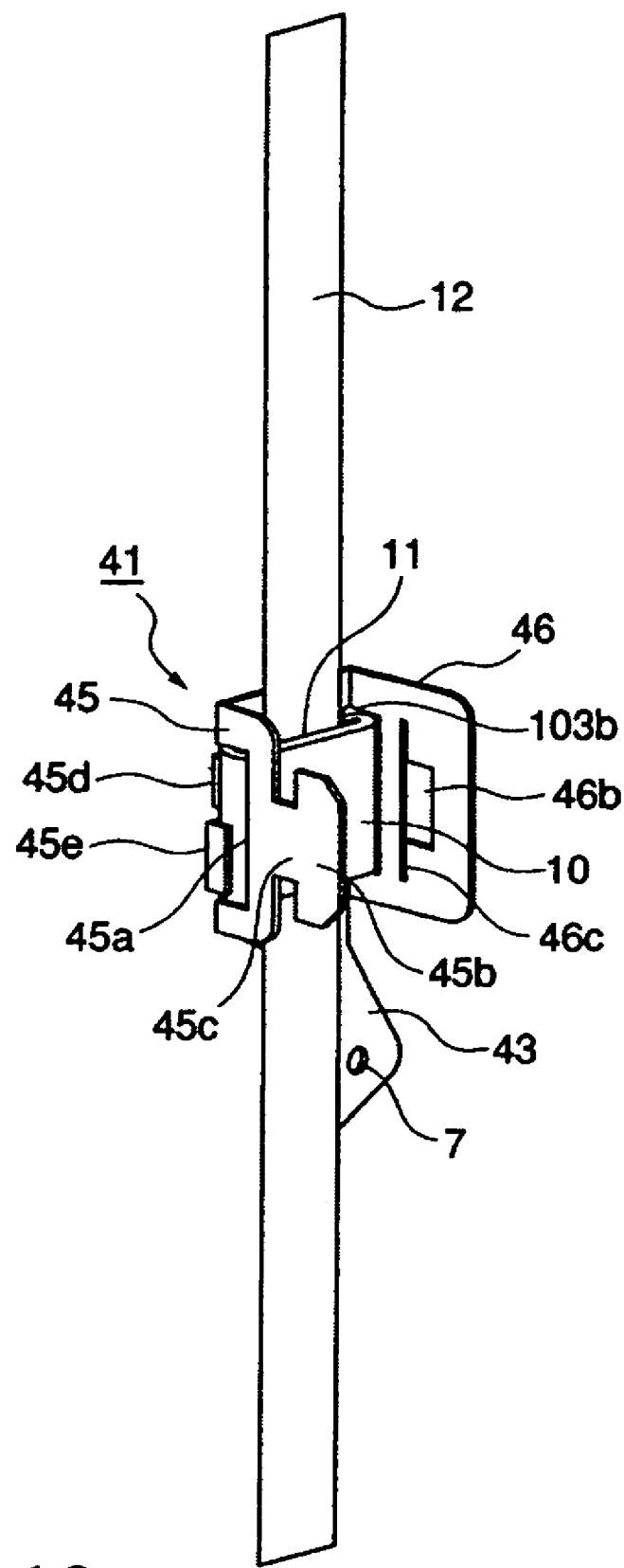
FIG. 12 is a perspective view showing the component fixing device according to the third embodiment of the present invention in a state that the component fixing device holds a ferrite core.
Figure 13:
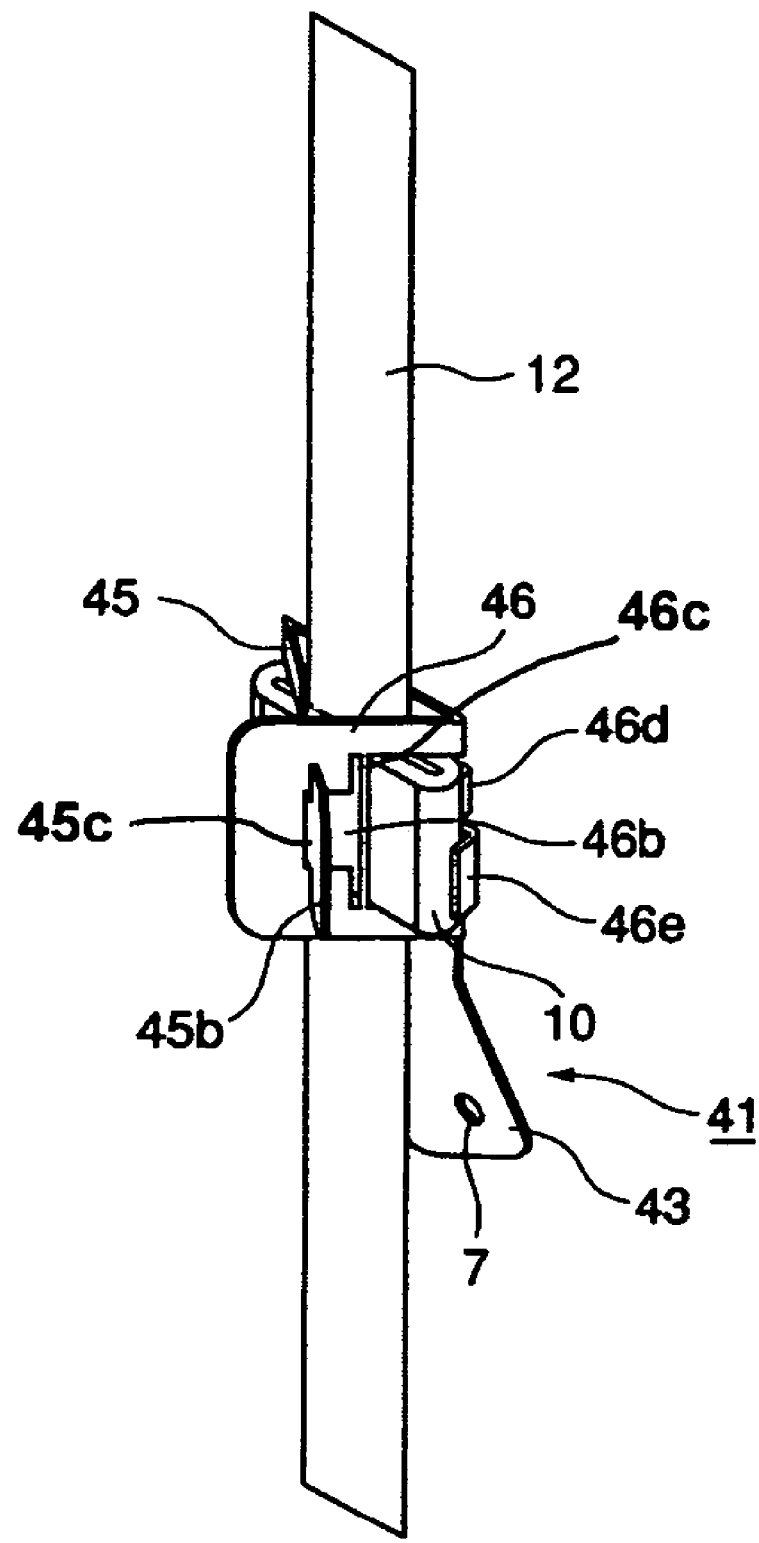
FIG. 13 is a perspective view showing the component fixing device according to the third embodiment of the present invention in a state that the component fixing device holds the ferrite core (No. 1)
Figure 14:
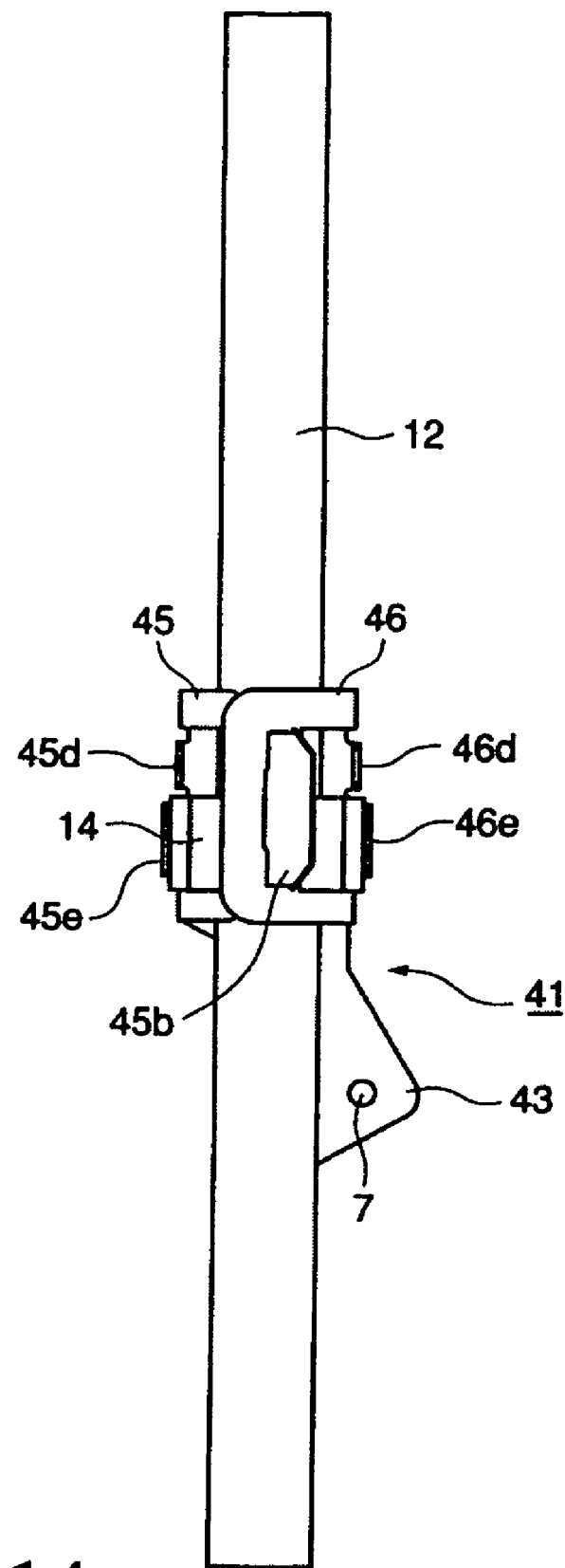
FIG. 14 is a perspective view showing the component fixing device according to the third embodiment of the present invention in a state that the component fixing device holds the ferrite core (No. 2).

An operation of the ferrite core fixing device 41 for holding the ferrite core 10 will be explained next. FIG. 12 is a perspective view showing an operation of the ferrite core fixing device 41 for holding the ferrite core 10. FIGS. 13 and 14 are perspective views showing the ferrite core fixing device 41 in a state that the ferrite core fixing device 41 holds the ferrite core 10. The ferrite core fixing device 41 in the third embodiment can hold two types of ferrite cores having different sizes (different lengths in the vertical direction in FIG. 11).

An operation of holding the ferrite core 10 having a large height will be explained first with reference to FIGS. 12 and 13. As shown in FIG. 12, first, the flat cable 12 passes through the hollow portion 11 of the ferrite core 10. In a state that the ferrite core 10 abuts against the center holding portion 44 of the ferrite core fixing device 41 (FIG. 11), the arm portions 45 and 46 are bent. At this time, both side portions of the ferrite core 10 enter the rectangular holes 45a and 46a, so that the arm portions 45 and 46 are easily bent. Then, the ferrite core 10 enters the rectangular holes 45a and 46a, so that a movement thereof in the vertical direction is restricted. Further, a movement of the ferrite core 10 in the lateral direction is restricted with the bent portions 45e and 46e. Since the ferrite core 10 presses the bent portions 45d and 46d from above, the ferrite core 10 is pressed against the arm portions 45 and 46 with an elastic force of the bent portions 45d and 46d.

Then, as shown in FIG. 13, the hook claw 45b of the arm portion 45 is inserted into the cut portion 46c of the arm portion 46. The base portion 45c of the hook claw 45b enters the rectangular hole 46b. Accordingly, the arm portion 45 engages the arm portion 46 in a state of holding the ferrite core 10.

An operation of holding the ferrite core 14 having a small height will be explained first with reference to FIG. 14. As shown in FIG. 14, the ferrite core 14 with a small height is held between the bent portions 45e and 46e. The bent portions 45e and 46e have the length (length in the vertical direction in FIG. 11) corresponding to the height of the ferrite core 14. Further, as described above, the distance between the bent portions 45d and 46d is set to be smaller than the distance between the bent portions 45e and 46e, thereby restricting a movement of the ferrite core 14 in the vertical direction with the bent portions 45d and 46d. Accordingly, even in a case of the ferrite core 14 with a small height, the ferrite core fixing device 41 can holds the ferrite core 14 and restricts a movement thereof in the lateral and vertical directions.

Similar to the first embodiment (FIG. 7), the ferrite core fixing device 41 holding the ferrite core 10 or the ferrite core 14 is fixed to the object with a screw. That is, a screw is inserted into the screw hole 7 formed in the fixed portion 43 of the ferrite core fixing device 41 to fix the ferrite core fixing device 41 to the frame of the electronic photo printer 20.

When the ferrite core 10 or the ferrite core 14 is removed from the electronic photo printer 20, an operation reversed from the operation described above is performed. That is, the screw fixing the ferrite core fixing device 41 to the frame is removed, so that the ferrite core fixing device 41 is removed from the frame. The hook claw 45b of the arm portion 45 of the ferrite core fixing device 41 is pulled out from the rectangular hole 46b of the arm portion 46. The arm portions 45 and 46 are opened to release the ferrite core 10 or the ferrite core 14. Alternatively, the ferrite core 10 or the ferrite core 14 may be pulled out from the ferrite core fixing device 41 in a state that the ferrite core fixing device 41 is fixed to the frame. In this case, it is easy to perform a maintenance operation of the electronic photo printer 20.

As described above, the ferrite core fixing device 41 is provided with the two types of bent portions at two stages for holding the ferrite core. Accordingly, in addition to the advantages of the second embodiment, the single ferrite core fixing device 41 can hold the two types of ferrite cores with different heights, thereby reducing cost of manufacturing the ferrite core fixing device 41. It is also possible to make part control and management easy, thereby reducing maintenance cost.

The disclosure of Japanese Patent Application No. 2004-267362, filed on Sep. 14, 2004, is incorporated in the application.

While the invention has been explained with reference to the specific embodiments of the invention, the explanation is illustrative and the invention is limited only by the appended claims.

What is claimed is:

1. An electrical device, comprising:
   a plurality of control boards;
   a frame for fixing the control boards;
   a cable for electrically connecting the control boards; and
   a component fixing device for fixing a component with a hollow portion for passing the cable, said component fixing device including a holding portion passing through the hollow portion for holding the component while restricting a movement of the component and a fixed portion elastically connected to and integrated with the holding portion and fixed to the frame wherein said holding portion includes a distal end portion and a step portion so that the distal end portion and the step portion hold the component, and wherein said holding portion further includes a pair of arm portions each having the distal end portion and an engaging portion so that the arm portions pass through the hollow portion by inserting the engaging portion into the hollow portion, said distal end portion and said step portion holding the component when the arm portions return to an original state after the arm portions pass through the hollow portion.

2. The electrical device according to claim 1, wherein said pair of arm portions capable of elastically bending, said arm portions being inserted into the hollow portion in a state that the arm portions are bent in a direction approaching with each other, said arm portions returning to an original state in the hollow portion for holding the component.

3. The electrical device according to claim 1, wherein said fixed portion includes a through hole for inserting a screw for fixing the fixed portion to the object.

4. The electrical device according to claim 3, wherein said fixed portion includes the through hole outside an area corresponding to the component.

5. The electrical device according to claim 1, wherein said holding portion holds a ferrite core as the component having the hollow portion for passing a flat cable as the cable.

6. The electrical device according to claim 1, wherein said component fixing device is formed of an elastic sheet.

7. The electrical device according to claim 2, wherein said component fixing device is formed of an elastic sheet.

8. The electrical device according to claim 2, wherein, said distal end portions and said step portions restricting the movement of the component.

9. The electrical device according to claim 8, wherein each of said at least two distal end portions includes a hook claw, said at least two distal end portions being arranged so that a distance between the hook claws is greater than a distance between the at least two engaging portions and a width of the hollow portion, said at least two step portions being arranged so that a distance between the engaging portions is greater than the distance between the at least two engaging portions and the width of the hollow portion.

10. The electrical device according to claim 9, wherein said at least two step portions are arranged so that a distance between the step portions is slightly greater than a width of the hollow portion.

* * * * *